May 1, 1962   C. J. ROSE ETAL   3,032,332
WING HANDLING FIXTURE AND METHOD OF USING
Filed Oct. 10, 1956   4 Sheets-Sheet 1

INVENTORS
CHESTER J. ROSE
NICKOLAUS W. MAGYAR
BY
ATTORNEY

INVENTORS
CHESTER J. ROSE
NICKOLAUS W. MAGYAR
BY
Julian C. Renfro
ATTORNEY

May 1, 1962 C. J. ROSE ETAL 3,032,332
WING HANDLING FIXTURE AND METHOD OF USING
Filed Oct. 10, 1956 4 Sheets-Sheet 3

INVENTORS
CHESTER J. ROSE
NICKOLAUS W. MAGYAR
BY
Julian C. Rofro
ATTORNEY

May 1, 1962 C. J. ROSE ETAL 3,032,332
WING HANDLING FIXTURE AND METHOD OF USING
Filed Oct. 10, 1956 4 Sheets-Sheet 4

INVENTORS
CHESTER J. ROSE
NICKOLAUS W. MAGYAR
BY *Julian C. Renfro*
ATTORNEY

United States Patent Office 3,032,332
Patented May 1, 1962

3,032,332
WING HANDLING FIXTURE AND METHOD
OF USING
Chester J. Rose, Towson, and Nickolaus W. Magyar, Baltimore, Md., assignors to Martin-Marietta Corporation, a corporation of Maryland
Filed Oct. 10, 1956, Ser. No. 615,156
12 Claims. (Cl. 269—41)

This invention relates to apparatus for mounting and demounting the wings of airborne vehicles, and more particularly it relates to demountable fixtures for facilitating the mounting in flight position of the wings of an airborne missile, and to the method of utilizing such fixtures.

Specifically, the type of aircraft construction to which our invention applies is that in which the complete wing, extending to the left and right of the body of the aircraft, is constructed in two halves, each of which is secured, directly or indirectly, at its root or inboard end to the fuselage.

The major components of pilotless aircraft and particularly guided missiles are manufactured at a factory and are then separately transported to a central assembly area at a convenient distance from one or more launching sites. At the assembly area, the fuselage is readied, and the wings, tail assembly, and rocket booster unit, if such is used, are assembled on the fuselage of the aircraft or missile in preparation for launching. For the most part, this handling and assembly of the components is performed in outdoor areas by technicians who typically are equipped only with simple hand tools. Usually, only a power or manually operated crane is available for lifting the heavier components. Nevertheless, the aircraft components must be fitted together with some precision and this is difficult where the handling of the components is performed primarily by manual means as it must be in military field operations, for example.

As stated, the actual launching site may be at some distance from the assembly area and the assembled missiles must be transported from there to the actual launching sites by airplane or over connecting roads. If the missile is fully assembled at the assembly area with the wings (it is understood that this means the two halves of the complete wing) fixed in the flight position, the wing span may be such that the missile cannot be placed in the cargo compartment of an airplane or transported over available connecting roads. Therefore, it is generally desirable, and often absolutely necessary, that the wings of the missile be left unmounted while the missile is transported to the launching site. Then it is necessary to complete the assembly of the missile by mounting the wings in flight position at the launching site. Because the wings are the heaviest and most unwieldy components to be assembled on the fuselage, this procedure practically requires that a crane and a trained crew of technicians be available at each separate launching site to perform the wing mounting job. Obviously, to perform the assembly operations at two different locations necessarily entails an inefficient use of both equipment and personnel.

We have invented a demountable fixture for facilitating the mounting and stowage of airborne missile wings which permits all the operations requiring the assistance of power equipment and skilled personnel to be performed at one location. Our new fixture permits the wings to be accurately positioned with respect to the aircraft fuselage and then to be folded against the fuselage during transportation from the assembly area to the launching site. There the wings are easily manipulated from the folded, over-the-ground transit position into the flight position and in precise alignment with the means for securing the wings to the missile body, all without the assistance of a power operated crane or any other elaborate handling machinery. Once the wing is firmly fixed to the aircraft body in flight position the fixture may be easily removed for reuse.

According to our invention we provide a fixture for facilitating the mounting in flight position and stowage in transit position of a demountable wing for an airborne missile. Basically the fixture comprises a bracket and a frame supported by the bracket. The bracket has a portion adapted to be attached to the missile body adjacent the structural portion thereof to which the wing root is secured when the wing is in flight position, and the frame is arranged to extend laterally from the body. A carriage is movably mounted on the frame so that its spacing from the attachable portion of the frame may be varied. The carriage itself carries wing-supporting means to which a missile wing may be detachably secured.

The proportions of the fixture and the scope of travel of the carriage on the frame are generally such that, when the wing is secured at a predetermined location thereon to the supporting means, the wing is completely free of interference with the missile body at one extreme of the carriage travel and may be accurately aligned with the wing mounting structure of the missile body at the other extreme of the carriage travel. The supporting means for securing the wing to the carriage is provided with a suitable pivot so that the wing may easily be rotated about the pivot between the flight position and a folded or over-the-ground transit position. Any suitable means may be used for supporting the outboard end of the wing while in the stowed position.

If the wing is of reasonable weight, one man may manipulate it into all of its positions with relative ease. Moreover, where our new fixture is utilized one man alone may locate the wing in the exact position required for the wing root to be bolted or otherwise secured to the missile body.

While the foregoing description has described a single fixture to be attached to the aircraft body, it is to be understood that for an aircraft having a wing consisting of two halves, a separate fixture according to this invention would be employed on each side of the fuselage, to support the respective wing halves.

The method of employing this invention comprises the steps of detachably securing the wing fixtures to the aircraft, locating the wing halves on the respective fixtures, and folding the fixtures and the wings against the fuselage of the aircraft so that the aircraft can be transported to a new location, if this be desired. Then, the wing fixtures are moved to an extended position in which they are substantially normal to the fuselage, and the wings are rotated with respect to the fuselage so as to bring them into an extended position. The wings are then moved into flight position, secured in operative relation with the fuselage, and the fixtures removed preparatory to launching the aircraft.

To assist the reader to a complete understanding of our invention, we describe in the following specification the presently preferred embodiment. In the course of this description reference is made to the accompanying drawings in which the components of the missile are shown in broken outline in the drawings.

Figure 1:
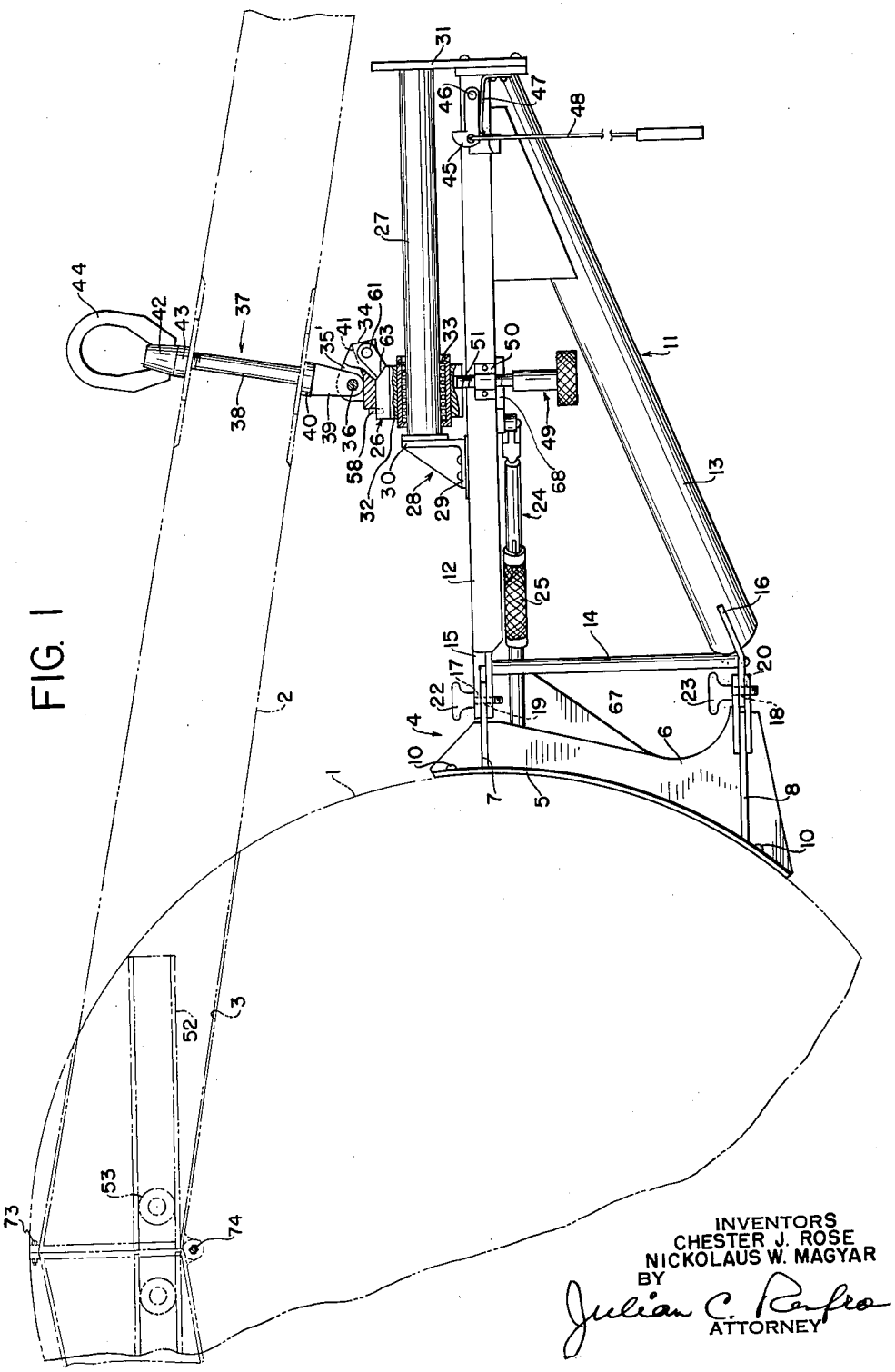
FIG. 1 is a front elevation of a mounting fixture for an airborne missile wing.
Figure 3:
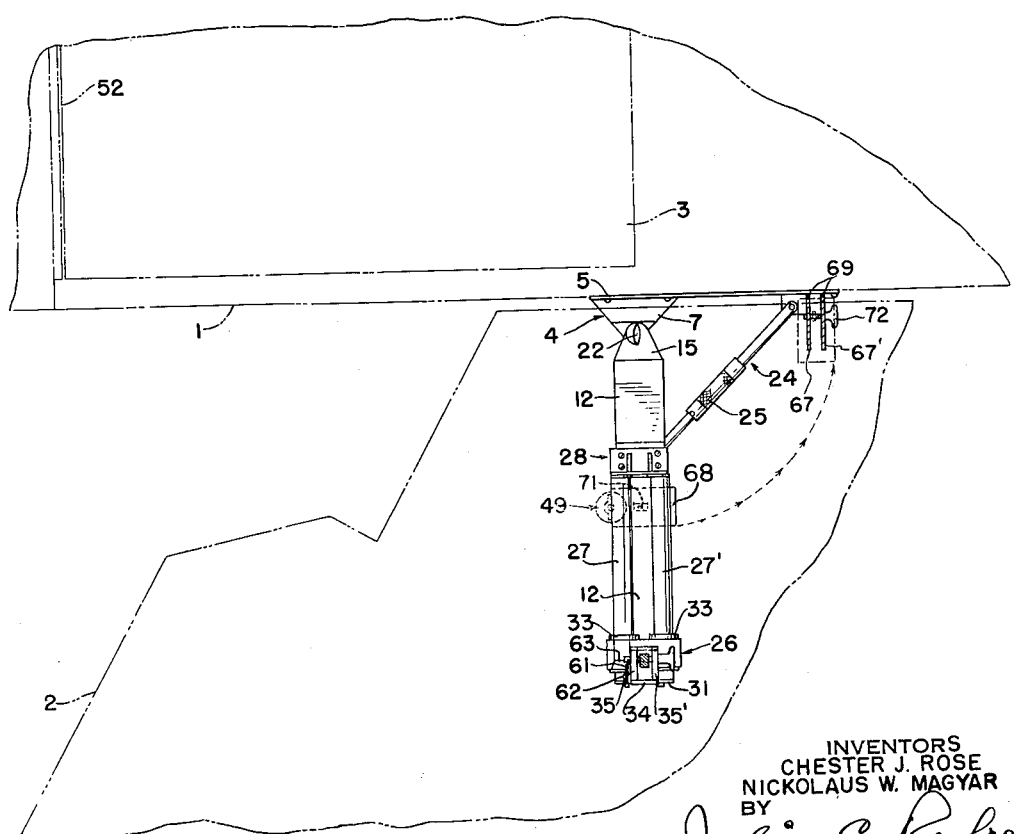
FIG. 3 is a plan view of the fixture as shown in FIG. 2, with certain parts broken away.

The fuselage 1 and one wing half 2 (simply referred to hereinafter as a wing) of an airborne missile are shown in phantom outline in each of the figures. The exact position of the wing with respect to the body will be described in detail during the discussion of each of the figures. It is sufficient to say at this point that this embodiment of the bracket is especially adapted to be used with a high wing monoplane type missile and that each side of the fuselage has an aperture or well therein for receiving the root or inboard end of the half of the wing on that side. This is best seen in FIGS. 1 and 3 where the aperture is shown in phantom outline at 3. When in flight position the root of the wing is inserted in this aperture and is then fixed to the body of the missile and to the other wing in any suitable manner.

Referring now to FIGS. 1 and 3, the fixture according to our invention comprises a bracket 4 having a mounting plate 5 which is shaped to fit the contour of the side of the fuselage 1. The bracket is also provided with a vertical member 6 which is fixed to the plate 5 to extend outwardly from it. Structural reinforcement of the member 6 is provided by the vertically spaced, horizontal upper and lower rib plates 7 and 8, respectively. The components of the bracket are preferably assembled into a unitary structure by welding them together. The mounting plate 5 is provided with a suitable number of holes through which fastening members, such as bolts 10 are inserted to removably secure the bracket to structural members of the center section of the fuselage.

The fixture also comprises a triangular track supporting frame 11 made up of an upper horizontal member 12, a lower or diagonal member 13 and a vertical member 14. The horizontal member and the diagonal member are rigidly fixed together at their outboard ends. Generally speaking, the entire fixture must be ruggedly constructed to endure the conditions of field operations.

At the inboard ends of the members 12 and 13, as seen in FIG. 1, there are bearing plates 15 and 16, respectively, which are rigidly fixed to their respective frame members and extending beyond the ends thereof. These plates are provided with holes 17 and 18, respectively, which are located to register with holes 19 and 20 of similar size in the reinforcing ribs 7 and 8. Hinge pins 22 and 23, respectively, are inserted through the holes 17 and 19 and 18 and 20 so that the triangular frame is supported by the bracket 4.

The frame structure 11 is rotatable about the vertical axis of the pins 22 and 23. However, a dog-leg link 24 having a sliding sleeve 25 is pivotally connected at its opposite ends between the underside of the member 12 of the frame 11 and a location toward the rear of the mounting plate 5. The length of the link 24 is such that, when fully extended and the sleeve 25 is in place over the knee of the link so as to engage a locking pin (not shown), the frame is locked in a position in which it extends approximately perpendicularly to the lateral surface of the mounting plate 50. When the sleeve 25 is moved away from the locking pin toward mounting plate 5, the knee may be broken so that the frame may be rotated rearwardly into a position which is substantially parallel to the surface of the plate 5. The purpose of this motion of the frame will be explained in detail below.

Figure 5:
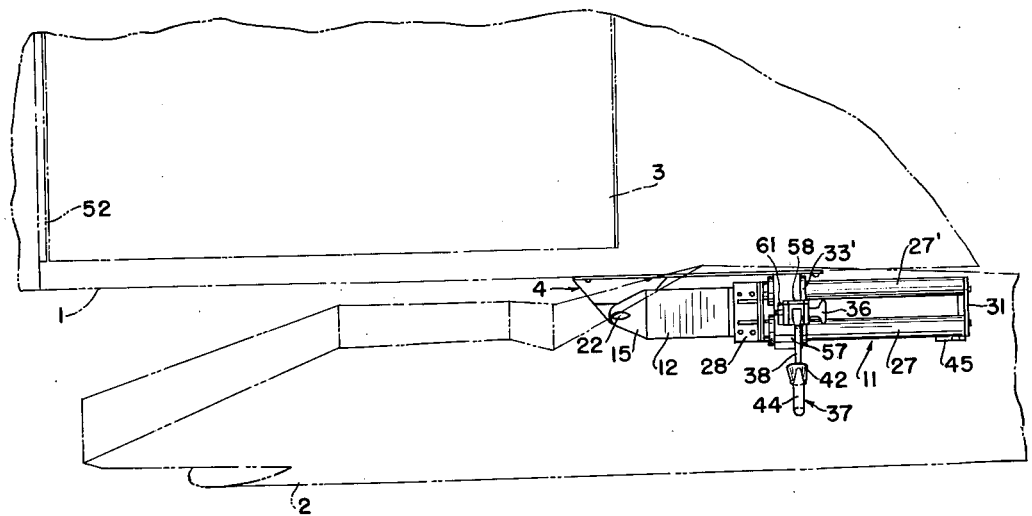
FIG. 5 is a plan view of the fixture as shown in FIG. 4, with the wing in the transit position.

A carriage 26 is adapted to move longitudinally of the frame member 12 on a track comprising a pair of parallel, cylindrical rods 27 and 27' which are most clearly shown in FIGS. 3 and 5. These rods are supported at their inboard ends (the left end in FIG. 1) by an angle bracket 28. One leg 29 of this bracket is bolted to the upper surface of the member 12 and the other leg 30 of the bracket projects upwardly from the frame member. The inboard ends of the track rods 27 and 27' are secured by welding or otherwise to the outboard face of the bracket leg 30 in spaced relation to the upper surface of the frame member 12.

The outboard ends of the track rods 27 and 27' are supported by a vertical plate 31 which is fixed to the joined ends of the frame members 12 and 13. The track rods are substantially parallel to the upper surface of the frame member 12.

The carriage 26 comprises a housing 32 in which are mounted side by side a pair of ball-type bushings 33 and 33' which are especially adapted for linear motion. The bushings are spaced apart in the housing so that, prior to permanently assembling of the track rods on their end supports the carriage is mounted on the rods by insertion of the rods through the bushings. Thus, the carriage is free to move longitudinally of the track throughout its length.

A pivot block 34 is mounted on the top of carriage housing 32 for rotation about an axis which is normal to the plane containing the axes of the track rods. To this end, a pin 64 is provided on the underside of pivot block 34 (see FIG. 6), and this pin extends downwardly into an appropriate hole located in the upper surface 32' of the carriage housing 32. A thrust bearing 65 through which pin 64 extends is located upon housing 32, and it is upon this bearing that the pivot block rests. Bearing 65 is preferably a thrust type ball bearing, the races of which are held together by an appropriate encircling member, not shown. The presence of the bearing maintains block 34 a sufficient distance above the upper surface 32' of housing 32 that block 34 can rotate clear of all portions of the housing.

Figure 6:
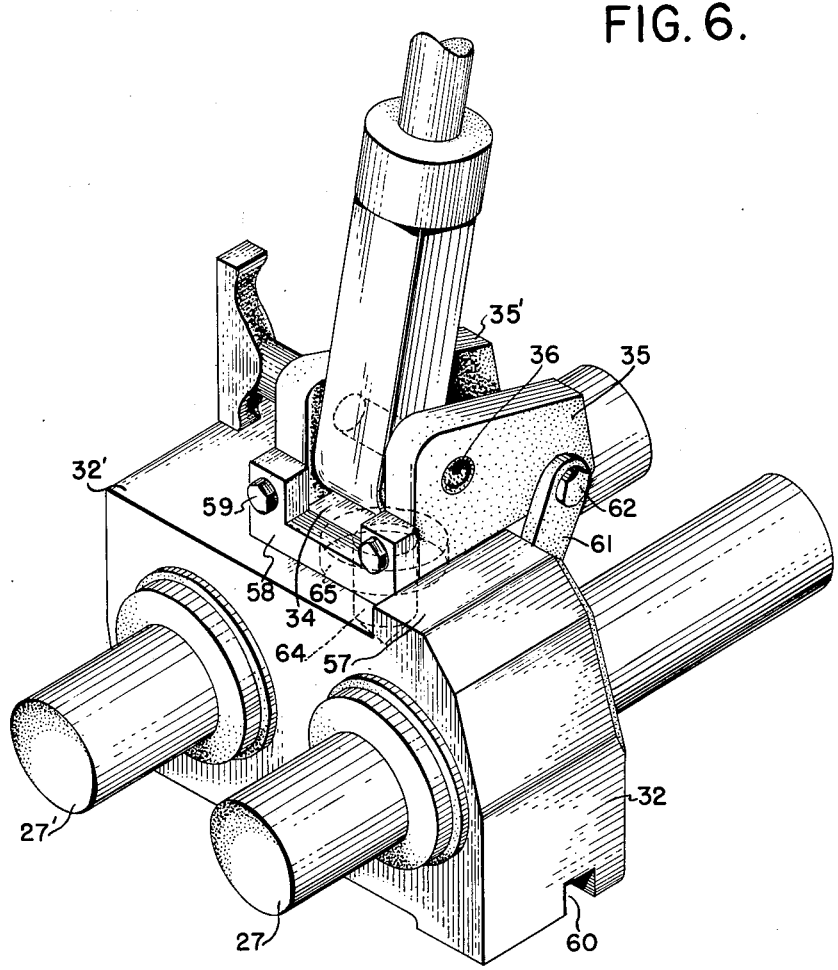
FIG. 6 is a perspective view to a larger scale illustrating the carriage and pivot block details.

Pivot block 34 is provided with two upright spaced lugs 35 and 35' as best seen in FIGS. 1, 3 and 6. These lugs have axially aligned holes drilled through them to receive a pivot pin 36. This pin is utilized to detachably secure a wing bearing assembly 37 to the block 34, and is preferably mounted directly over pin 64.

The wing bearing assembly 37 comprises a shaft 38 which carries adjacent one end a thrust bearing or collar 40. The portion 39 of shaft 38 below bearing 40 is shaped to fit between the lugs 35 and 35' and is drilled through to receive the pivot pin 36. Thus, the shaft 38 is free to pivot about the horizontal axis of the pin 36. This pivoting travel is limited by engagement of the surface 41 on pivot block 34 between the lugs 35 and 35' with the side surface of the shaft portion 39 when the assembly 37 is rotated into a substantially horizontal position extending outboard of the fixture. Note the dotted line position of shaft 38 in FIG. 2.

The free end of shaft 38 opposite the portion 39 is threaded to receive an internally threaded member 42 which carries a thrust bearing 43 similar to bearing 40. The length of the shaft between the bearings 40 and 43 is approximately equal to the thickness of the missile wing. The member 42 is also provided with a crane hook eye 44, the purpose of which will be explained below.

The freedom of the carriage 26 to move along the track is limited at the outboard end by a spring loaded latch 45 which pivots about a pin 46 fixed to the frame member 12. A leaf spring 47 constantly urges the latch upwardly into the path of the carriage and a suitable lanyard 48 is provided to pull the latch downwardly against the spring and out of the way of the carriage. The rounded end of the latch 45 serves as a camming surface so that the lower portion of the housing 32 of the carriage 26 will push the latch downwardly against the spring 47 and allow the carriage to pass to the outboard extreme of the track. When the carriage is in this position the spring will again push the latch upwardly into the path of the carriage to retain it in this position until the latch is released by a downward pull on the lanyard 48.

Near the inboard end of the track we provide a screw 49 which is mounted on the side of the frame member 12 by a small internally threaded bracket 50. The pin 51 of the stop 49 itself is threaded so that it may be advanced vertically through the bracket to enter slot 60 on the bottom of the carriage housing 32. This screw stop provides means for positively locking the carriage at the inboard end of its travel along the track, and also for securing the carriage in position for overland transport, as will be described in greater detail hereinafter.

The relationship of carriage housing 32 and pivot block 34 is such that the pivot block can be rotated to a position on housing 32 that is particularly adapted for overland transport, and also can be rotated to a locking position approximately 90° away from the preceding position. When in the locked position, the pivot block will be positioned with respect to the housing 32 so that the manipulation of wing 2 into the correct position with respect to the fuselage will be facilitated.

As best seen in FIG. 6, an upstanding edge or shoulder 57 is provided on housing 32. This shoulder 57 makes it possible to lock the block 34 in the position shown in FIGS. 1 through 3 and 6 so that the wing can most easily be moved from the folded position in which it resides in a substantially vertical plane, into a plane approaching the horizontal, so that it can be moved into engagement with the fuselage. This locking action is brought about by a stop 58 secured to the rear side of block 34 and a pawl 61 that is pivotally mounted upon lug 35 by means of a bolt 62 or the like. Stop 58 is secured to block 34 such as by the use of bolts 59 or the like, and the stop extends sufficiently below the lowermost portion of block 34 that it can engage shoulder 57. It is to prevent on occasion the rotation of pivot block 34 away from the position in which stop 58 engages shoulder 57 that the pawl 61 is provided. As seen in FIG. 1, the outboard edge of shoulder 57 is shaped at an angle so as to form a sloped surface 63. The free end of pawl 61 is shaped to engage this surface, and when the pawl is in the position shown in FIG. 1, because of the combined action of stop and pawl, any rotation of block 34 is prevented.

Because of this locking of the block 34, the movement of wing 2 into proper engagement with the fuselage is greatly simplified, for the shaft 38 is prevented from rotating away from the position in which the pivot pin 36 is substantially in alignment with the center line of the fuselage 1. This is most important, for although shaft 38 extends substantially through the center of gravity of the wing, the wing is nevertheless an unwieldy structure when it is being manipulated from the wing tip. If pivot block 34 were allowed accidentally to rotate back into the position with respect to carriage housing 32 that it was in while the frame 11 was in the folded position, this would allow shaft 38 to rotate about pivot pin 36 as to permit the leading edge of wing 2 to drop downwardly and forwardly into a position in which the wing root could not be attached to the fuselage. It is to prevent movement of shaft 38 away from the position in which pivot pin 36 is acting as the pivot about which the operator manipulates the wing during the wing attachment procedure that this locking of block 34 is provided.

According to further aspects of the carriage housing-pivot block arrangement, when the missile is being transported, means are provided to transfer the weight of the wing from pivot block 34 to the shoulder 57 of housing 32, and from the housing directly to the load bearing members 67 and 67' that are secured to mounting plate 5 attached to the missile fuselage. Because of this arrangement, undesirable deflection of rods 27 and 27' is prevented. When the track supporting frame 11 is in the folded position shown in FIGS. 4 and 5, the pivot block 34 is positioned so as to rest upon shoulder 57 in such a manner that the shoulder rather than pin 64 of the pivot block bears most of the weight. This latter fact is true because surface 41, the portion of pivot block 34 against which shaft 38 rests, is directly above shoulder 57 when the frame is in the folded position.

Figure 4:
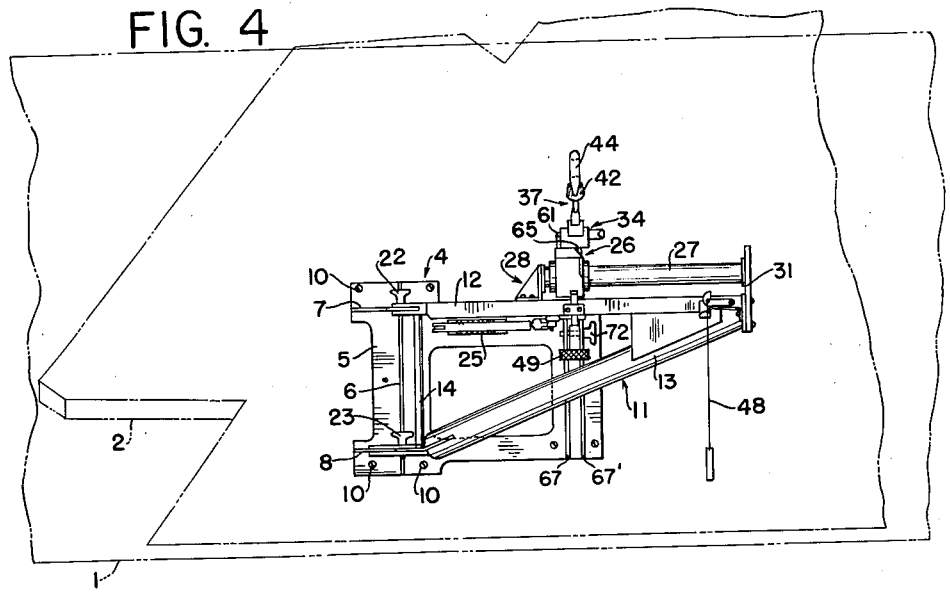
FIG. 4 is a side elevation of the fixture of FIG. 1 when the fixture is folded.

When the supporting frame is in the position shown in FIGS. 4 and 5, a central portion of the upper horizontal member 12 is located directly above the vertically disposed load-bearing structural members 67 and 67' that are affixed upon the rearward part of mounting plate 5. Bearing plate 68 is secured to the underside of upper horizontal member 12, and the upper surfaces of members 67 and 67' are arranged to be engaged by the bearing plate when the frame has been moved to the folded position. The members 67 and 67' are located at the correct height with respect to frame 11 so as to bear a high proportion of the weight of the airplane wing carried upon the frame. Stops 69 are provided on the inboard ends or edges of the bearing surfaces of members 67 and 67' to prevent the frame 11 from swinging inwardly beyond the desirable folded position. The path of travel of bearing plate 68 is indicated in FIG. 3.

Centrally disposed on the underside of bearing plate 68 is tang 71 that moves in between load bearing members 67 and 67' when the frame has been moved to the folded position. Appropriate aligned holes are provided in the tang and in members 67 and 67' to receive a pin 72 so that the frame can be secured to the load bearing members to prevent undesirable movement away from the folded position.

When the frame is in the folded position so as to be resting upon load bearing members 67 and 67', by the use of screw stop 49, the weight of the wing can effectively be removed from rods 27 and 27'. This is because when stop 49 has been turned so tightly as to bottom against the underside of its threaded bracket 50, the pin 51 of the stop extends up into the groove 60 located in the bottom of carriage 32 so as to contact the carriage and actually lift it up somewhat. This causes the weight of the carriage and wing to be transferred directly to members 67 and 67'.

This completes the description of the structure of our new fixture. In summary, the motions of the several components of the fixture are: (1) the bearing assembly 37 may rotate within certain limits about the horizontal axis of the pivot pin 36; (2) the pivot block 34 may rotate about its vertically disposed pin 64 extending into the top surface of housing 32; (3) the carriage 26 moves back and forth along the track comprising the rods 27 and 27' and may be locked at the ends of the track by the latch and the screw stop provided; (4) the triangular frame 11 carrying the track members 27 and 27', on which the carriage 26 travels, rotates about the vertical axis of the pins 22 and 23 between the limits set by the dog link 24 and the load bearing members 67 and 67'. Additionally, the wing 2 is rotatable about shaft 38, which fact is particularly important during the wing-installation procedure, when the pivot block 34 is in the locked position.

The proportions and the operation of this particular embodiment of our invention are especially adapted to a particular missile. The center section of the fuselage is provided with an aperture or well 3 in each side thereof. The wing root of each wing half must be inserted into its well so that that wing half may be "spliced" to the other wing root, and secured to the structural members of the fuselage. As seen in FIG. 1, tension bolts 73 and shear bolts 74 are employed to secure the wing halves together, and hold down bolts (not shown) are employed to secure the wings to the fuselage.

It will be readily understood that insertion of the wing roots into the well requires that each wing half be carefully oriented with respect to the fuselage and then moved into its aperture. Moreover, the bolt holes in each wing root must be accurately aligned with the mating bolt holes in the structural members of the fuselage and the other wing root so that the bolts may be easily and quickly inserted. To assist in this splicing operation, we provide guide track 52 mounted inside the well along the forward side walls. A small roller 53 is fixed adjacent the root of each wing half and these are adapted to engage the track 52 in the aperture. The engagement of the rollers with the track 52 guides the wing roots into precise alignment with the structural members of the fuselage as they are inserted into the aperture in the fuselage.

The length of the track on the frame 11 and the position of the wing fixture along the fuselage with respect to the aperture in the central section thereof are made such that when the frame 11 extends outwardly of the fuselage 1 and the carriage is at the extreme outboard end of the track, a missile wing mounted between the thrust bearings or collars 40 and 43 with the shaft 38 passing through the center of gravity of the wing, is completely free of interference between the wing root and the lateral surface of the fuselage. On the other hand, when the carriage is at the extreme inboard end of its track, the wing may be precisely aligned in flight position.

Now, the operation of this embodiment of our invention is as follows. The fuselage of the missile is placed on a launching vehicle at the assembly area. This launching vehicle may be in the nature of the lightweight launcher described in the copending application of Matheisel and Cooke entitled "Launcher," filed July 18, 1956, Serial No. 598,660, now Patent Number 2,922,602. The other components of the missile, which have been brought separately to the assembly area, must be assembled on the fuselage. As previously pointed out, mounting the tail assembly and the external rocket booster is a relatively simple operation and neither of these components is of such a size that it interferes with the transportation of the missile over the ground. However, the matter of mounting the wings on the missile and of securing the wings to the missile in folded position so that it may be transported over the ground is a problem of an entirely different magnitude. Our new fixture greatly simplifies this problem. First the fixture is secured to the fuselage by means of bolts 10. Then the bearing assembly 37 is removed from the fixture by withdrawing the pivot pin 36. The shaft end 42 is unscrewed from the shaft.

Each wing half is provided with a through hole located approximately at the center of gravity of the wing. The upper and lower surfaces of the wing are provided with suitable reinforced seats for the thrust bearings 40 and 43, respectively. When the wing is uncrated at the assembly area, the shaft 38 is inserted in the hole through the wing, whereupon the shaft end 42 is screwed back onto the shaft until the thrust bearings 40 and 43 are firmly seated. The hook of a crane is then inserted in the eye 44 and the wing is lifted by the crane to a position adjacent the fuselage. The triangular assembly of the fixture is locked in its fully extended position by the dog link 24. The carriage 26 is placed at the outboard end of the track and is held in position by the latch 45. One man may easily guide the wing into position so that the hole in the fitting 39 is in alignment with the holes in the lugs 35 and 35' of the pivot block 34. The pin 36 is then inserted through the holes and the crane hook is removed from the eye 44. Now, the entire weight of the wing is supported by the fixture. Inasmuch as the shaft 38 is deliberately located at the center of gravity of the wing, the wing may be easily manipulated into any desired position by one man.

When first mounted on the fixture, the wing extends fore and aft substantially in alignment with the center line of the fuselage, and is disposed substantially in the horizontal plane. Note wing position A in FIG. 2. The wing may now be rotated in the horizontal plane approximately 90° so as to place it in a position in which it can easily be installed on the fuselage. In the typical instance, however, it is desirable to fold the wing into the transit position, so that the missile may be transported to the launching area.

Figure 2:
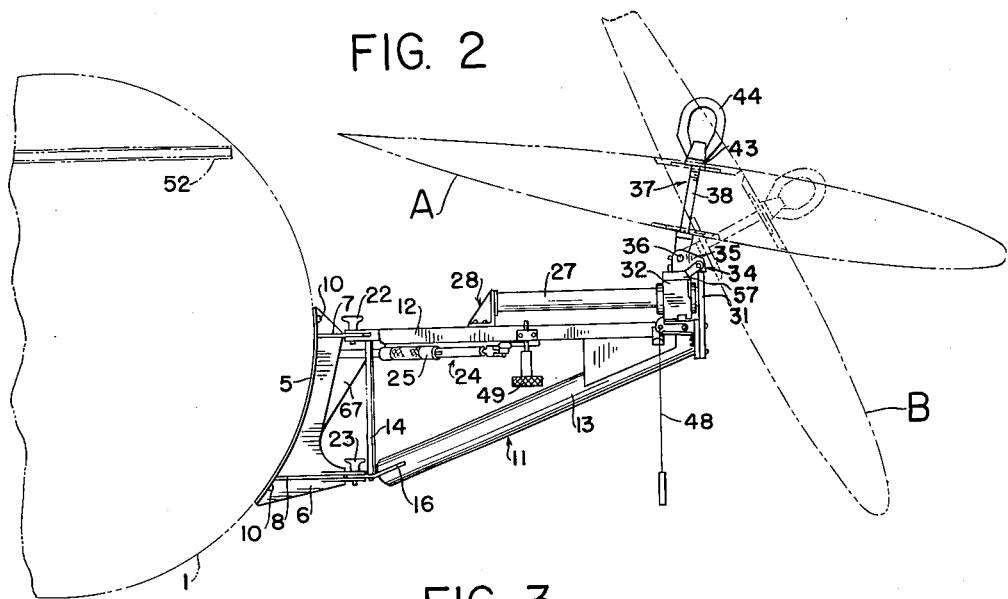
FIG. 2 is another front elevation of the fixture of FIG. 1, but with the carriage in the extended position and the wing rotated approximately 90° away from the position shown in FIG. 1.

To fold the wing, it is first tilted downwardly about pivot pin 36 until the wing is in position B shown on FIG. 2. In this position, shaft 38 is resting against surface 41 of pivot block 34, and the leading edge of the wing is substantially parallel to the ground, and at some distance from fuselage 1.

That the wing may be placed closely against the side of the fuselage, the sleeve 25 is moved so as to permit dog link 24 to collapse and thereby allow the frame 11 to be brought up against the fuselage, with plate 68 resting upon the bearing surfaces of vertically disposed load bearing members 67 and 67'. Pin 72 is then inserted through the holes in members 67 and 67' and the tang 71 so as to secure frame 11 in the folded position.

The folded wing is then pushed forwardly along the side of the fuselage until the carriage 26 has reached its forwardmost position on its track, in which position it can be locked by the use of screw stop 49. As previously mentioned, by sufficient tightening of member 49, the weight of the wing is effectively transferred from the carriage to the vertical members 67 and 67' that are affixed to bracket 4. Chocks can now be placed on the leading and trailing edges of the wing near the wing tip, and the wing tip supported by suitable straps or stowage brackets.

To move the wings into the flight position at the launching area, the stowage bracket and the chocks are removed from the wing tip. Then, screw stop 49 is loosened, permitting the carriage to be moved along its track. With a man at the wing tip, the wing is pulled aft until the carriage housing is automatically locked at the outboard end of the track by latch 45. The pin 72 is removed from the tang 71, permitting the frame 11 to be swung about hinge pins 22 and 23 outwardly away from the fuselage. After the frame has moved away somewhat from the fuselage, by pushing forwardly on the wing, it is a relatively simple matter to move the frame 11 into the extended position. Then, when the dog leg link 24 is straight, it is locked in this position by appropriate sliding movement of sleeve 25.

The wing may now be moved into the flight position. This is most easily accomplished by grasping the wing tip, and with a combined pivoting and rotating movement, swinging the wing tip outwardly and forwardly so as to place the wing root in substantially correct relation to the fuselage, and the principal surfaces of the wing in flight attitude. It should be noted that this outward and forward swinging movement of the wing tip causes the pivot block 34 to pivot about its pin 64. Pawl 61 moves across the upper surface of shoulder 57 until the stop 58 engages the shoulder, and the pawl drops into place against surface 63 to complete locking of the pivot block in the wing attaching position.

Since the wing is substantially in the correct flight attitude with respect to the fuselage (but spaced therefrom), the wing can be moved into final position by simple up and down movements of the tip. The pivot pin 36 of the pivot block is the point about which the wing is moved, and since the pivot block is locked against rotation, the pin cannot move into a position aligned with rods 27 and 27'. (Such a position of the pin 36 might allow the wing to drop forwardly until shaft 38 contacts surface 41, which would place the wing in a position in which it could not be attached to the fuselage.)

By proper movements of the wing tip, the roller 53 can be placed in alignment with the guide track 52. The lanyard 48 is now pulled to release latch 45, so that the carriage can be moved inboard along rods 27 and 27'.

As the carriage is moved inwardly toward the fuselage, the roller 53 moves along guide track 52 so as to position the root rib of the wing so that it can be secured to the fuselage and to the other wing. Then, when the other wing of the aircraft has been installed according to the procedure outlined above, the tension bolts 73 and the shear bolts 74 can be installed so as to secure the wings together. Then the hold down bolts (not shown) are installed so as to secure both wings to the fuselage.

Upon the completion of the wing installing operations, the pin 36 is removed from each wing fixture so that the wings are no longer supported by the fixtures. The bolts 10 holding the brackets 4 to the fuselage are then removed to free the fixtures from the missile, the shaft end 42 is unscrewed from each shaft 38, and the bearing assemblies 37 are removed from the wings.

Various control connections to the wings can now be completed from the top of the fuselage of the missile. For instance, if the missile wings are equipped with spoilers, the spoiler linkages can be operatively connected to the spoiler operating mechanisms contained in the fuselage. Then when all the proper connections have been made, a cover is place upon the fuselage so as to round out the contour of the fuselage in the wing locations.

If it happens that the missile is not launched and the wings must again be moved to the folded position, this can be accomplished by reversing the steps of the above-outlined procedure. The wing fixtures would again be secured to the fuselage, and the wings attached thereto. It is of interest to note that when a wing is moved outwardly along its track, the pivot block 34 is automatically unlocked. This is because the upper edge of vertical end plate 31 is of such a height with respect to pawl 61 that it causes the pawl to be moved upwardly away from engagement with surface 63, into the unlocked position. The wing may then be folded according to the previously described procedure.

Having described the construction and operation of this embodiment of our invention to illustrate the features of the invention, we claim:

1. A fixture for facilitating the mounting of a detachable wing in flight position on the fuselage of an airborne missile and for stowing a detachable missile wing in transport position, which fixture comprises a mounting bracket, a structural frame hinged to said bracket, said bracket being adapted for attachment to a missile fuselage with the hinge axis oblique to the longitudinal axis of the missile fuselage, said structural frame extending away from said hinge and having fixed thereto a linear track extending substantially normal to the hinge axis, a carriage mounted on said track for non-rotative movement therealong, means for automatically locking said carriage in a fixed position on said track as said carriage approaches the end of said track remote from said hinge axis, pivotal means on said carriage, rotatable about an axis normal to a plane passing through said track, for supporting a missile wing, and means for locking said pivotal means with respect to the rest of said carriage whereby a wing detachably secured to said pivotal means may be pivoted on said fixture into proper engagement with the missile body.

2. A fixture according to claim 1 in which the pivotal means for detachably securing a wing to the carriage comprises a shaft pivotally mounted at one end on said carriage and a thrust collar fixed to said shaft intermediate the ends.

3. A fixture according to claim 1 in which the carriage comprises a body portion mounted on said track, and said pivotal means is a pivot block movably mounted on said body portion for rotation about an axis substantially normal to said track, and in which the means for detachably securing a wing to the carriage comprises a shaft pivotally mounted at one end on said pivot block, and a thrust collar fixed to said shaft intermediate the ends.

4. A fixture for facilitating the mounting of a detachable wing in flight position on the fuselage of an airborne missile and for stowing a detachable missile wing in transport position, which fixture comprises a cantilever structural frame defining a firm track-supporting base, one end of said frame being adapted to be detachably secured to a missile fuselage, a track secured on the upper surface of said frame, said track extending away from the attachable end of said frame, a carriage mounted on said track such that the spacing between the carriage and the attachable end of the frame may be varied, and wing supporting means on said carriage to which a missile wing may be demountably secured for guided movements toward and away from said fuselage, said means for detachably secured a wing to the carriage comprising a shaft pivotally mounted at one end on said carriage and a thrust collar fixed to said shaft intermediate the ends.

5. A fixture for facilitating the mounting of a detachable wing in flight position on the fuselage of an airborne missile and for stowing a detachable missile wing in transport position, which fixture comprises a cantilever structural frame defining a firm track-supporting base, one end of said frame being adapted to be detachably secured to a missile fuselage, a track secured on the upper surface of said frame, said track extending away from the attachable end of said frame, a carriage mounted on said track such that the spacing between the carriage and the attachable end of the frame may be varied, and wing supporting means on said carriage to which a missile wing may be demountably secured for guided movements toward and away from said fuselage, said carriage comprising a body portion mounted on said track, a pivot block movably mounted on said body portion for rotation about an axis substantially normal to said track, and in which the means for detachably securing a wing to the carriage comprises a shaft pivotally mounted at one end on said pivot block, and a thrust collar fixed to said shaft intermediate the ends.

6. A fixture for facilitating the mounting of a detachable wing in flight position on the fuselage of an airborne missile and for stowing a detachable missile wing in transport position, which fixture comprises a mounting bracket, a structural frame hinged at one end to said bracket, said bracket being adapted for attachment to a missile fuselage with the hinge axis substantially vertical when the attitude of the missile fuselage is that of level flight, means for releasably locking the frame in a position wherein it extends substantially normal to the fuselage, said structural frame having mounted thereon a pair of spaced parallel track members extending substantially normal to the hinge axis, a carriage body mounted on said track members for movement therealong, means for releasably locking the carriage body at predetermined locations along the track members, a pivot block mounted on said body for rotation about a vertical axis through the body, and a shaft carrying bearing surfaces for supporting a missile wing therebetween, said shaft being mounted on said pivot block for rotation about a horizontal axis adjacent one end of the shaft and perpendicular to the longitudinal axis of the shaft.

7. A fixture for facilitating the mounting of a detachable wing in flight position on the fuselage of an airborne missile and for stowing a detachable missile wing in transport position, which fixture comprises a cantilever structural frame defining a firm track-supporting base, one end of said frame being adapted to be detachably secured to a missile fuselage, a track secured on the upper surface of said frame, said track extending away from the attachable end of said frame, a carriage mounted on said track such that the spacing between the carriage and the attachable end of the frame may be varied, and wing supporting means on said carriage to which a missile wing may be demountably secured for guided movements toward and away from said fuselage, said wing supporting means includes a rotatable pivot block adapted to be moved into a variety of positions with respect to said carriage, locking means associated with said pivot block, enabling it to be locked in a wing installing position with respect to said carriage, said pivot block, when locked in the wing installing position, facilitating the installation of a detachable wing in flight position on the missile fuselage.

8. The fixture as defined in claim 7 in which said frame is hinged for movement between a folded position lying alongside the fuselage and a position wherein it extends substantially normal to the fuselage, the movements of said carriage, pivot block and frame making it possible for the wing to be folded into a transport position in which it resides alongside the fuselage.

9. A fixture for facilitating the mounting of a detachable wing in flight position on the fuselage of an airborne missile and for stowing the wing in a transport position, which fixture comprises a mounting bracket adapted for attachment to a missile fuselage, a structural frame hinged at one end to said bracket and being movable between two definitely established positions, said frame being movable between a folded position in which it lies alongside the fuselage, and an extended position wherein it can be locked in a position extending substantially normal to the fuselage, a track on said frame, a carriage for non-rotative movement along said track such that the spacing between the carriage and the hinged end of the frame may be varied, means for locking said carriage at at least one position on said track, wing supporting means on said carriage to which a missile wing may be demountably secured, means for locking said wing supporting means against undesirable rotation with respect to the carriage when said frame is in the extended position, a structural load-bearing member on said mounting bracket spaced from the hinge of said frame, said load-bearing member being positioned to support the weight of said hinged frame and a missile wing carried thereby when said frame has been moved to the folded position, a bearing plate secured to said frame to engage said load-bearing member when said frame has been moved to the folded position, and means to secure said bearing plate to said load-bearing member so that said frame can be locked in the folded position.

10. A fixture for facilitating the mounting of a detachable wing in flight position on the fuselage of an airborne missile and for stowing the wing in a transport position, which fixture comprises a mounting bracket adapted for attachment to a missile fuselage, a structural frame hinged at one end to said bracket and being movable between two definitely established positions, said frame being movable between a folded position in which it lies alongside the fuselage, and an extended position wherein it can be locked in a position extending substantially normal to the fuselage, a track on said frame, a carriage mounted for non-rotative movement along said track such that the spacing between the carriage and the hinged end of the frame may be varied, means for locking said carriage at at least one position on said track, wing supporting means on said carriage to which a missile wing may be demountably secured, means for locking said wing supporting means against undesirable rotation with respect to the carriage when said frame is in the extended position, a structural load-bearing member on said mounting bracket spaced from the hinged of said frame, said load-bearing member being positioned to support the weight of said hinged frame and a missile wing carried thereby when said frame has been moved to the folded position, and means for releasably locking the carriage adjacent the end of the track that is nearest the hinge of said frame, said locking means being arranged to transfer the load borne by the carriage away from the track, and directly to said load-bearing member when said frame is in said folded position.

11. A fixture for facilitating the mounting of a detachable wing in flight position on the fuselage of an airborne missile and for stowing a detachable missile wing in transport position, which fixture comprises a cantilever structural frame having first and second frame portions joined by a hinge having a substantially vertical pivot axis, said first frame portion being adapted to be detachably secured to a missile fuselage, said second frame portion being movable in a horizontal direction between two definitely established positions, said positions being a folded position disposed substantially alongside the missile fuselage, and an extended position disposed subtantially perpendicular to said fuselage, a carriage mounted upon the upper part of said second frame portion for non-rotative controlled movement upon said second frame portion between a position closely adjacent said hinge, and a position remote therefrom, and wing supporting means pivotally mounted on said carriage to which a missile wing may be demountably secured, the pivotal movements of said wing supporting means enabling a wing to be pivoted between a position in which the wing is disposed substantially parallel to the fuselage, and an extended position in which it forms a substantial angle therewith, the range of movements of said carriage along said second frame member when latter member is in the extended position facilitating the placement of the wing in the flight position upon the fuselage.

12. A fixture according to claim 11 which comprises means for locking said second frame portion in said extended position, and means for automatically locking said carriage in said remote position on said second frame member.

References Cited in the file of this patent

UNITED STATES PATENTS

| | | |
|---|---|---|
| 715,147 | Redington | Dec. 2, 1902 |
| 1,126,053 | McGough | Jan. 26, 1915 |
| 1,360,377 | Drange | Nov. 30, 1920 |
| 1,800,209 | Christopherson | Apr. 14, 1931 |
| 2,378,043 | Sorensen et al. | June 12, 1945 |
| 2,391,510 | Pioch et al. | Dec. 25, 1945 |
| 2,543,221 | Barany | Feb. 27, 1951 |
| 2,552,927 | Benisek | May 15, 1951 |
| 2,623,643 | Seamans | Dec. 30, 1952 |
| 2,650,718 | Palmer | Sept. 1, 1953 |
| 2,686,959 | Robinson | Aug. 24, 1954 |
| 2,686,960 | Le Roy | Aug. 24, 1954 |
| 2,731,712 | Laux | Jan. 24, 1956 |
| 2,754,012 | Hines | July 10, 1956 |